(12) United States Patent
Farris et al.

(10) Patent No.: US 12,071,990 B2
(45) Date of Patent: Aug. 27, 2024

(54) ELECTROMAGNETIC BRAKE FOR POWERED MOBILITY ASSISTANCE DEVICE

(71) Applicant: Ekso Bionics Holdings, Inc., San Rafael, CA (US)

(72) Inventors: Ryan J. Farris, Mechanicsburg, PA (US); Geoffrey W. Kennard, Arvada, CO (US)

(73) Assignee: Ekso Bionics Holdings, Inc., San Rafael, CA (US)

( * ) Notice: Subject to any disclaimer, the term of this patent is extended or adjusted under 35 U.S.C. 154(b) by 567 days.

(21) Appl. No.: 17/435,743

(22) PCT Filed: May 4, 2020

(86) PCT No.: PCT/US2020/031308
§ 371 (c)(1),
(2) Date: Sep. 2, 2021

(87) PCT Pub. No.: WO2020/242728
PCT Pub. Date: Dec. 3, 2020

(65) Prior Publication Data
US 2022/0136576 A1 May 5, 2022

Related U.S. Application Data

(60) Provisional application No. 62/855,085, filed on May 31, 2019.

(51) Int. Cl.
*F16D 63/00* (2006.01)
*A61H 1/02* (2006.01)
(Continued)

(52) U.S. Cl.
CPC ............ *F16D 63/002* (2013.01); *A61H 1/024* (2013.01); *A61H 1/0244* (2013.01); *A61H 3/00* (2013.01);
(Continued)

(58) Field of Classification Search
CPC ........ A61H 1/024; A61H 1/0244; A61H 3/00; A61H 2201/1215; A61H 2201/1463;
(Continued)

(56) References Cited

U.S. PATENT DOCUMENTS 4,566,575 A * 1/1986 Sekella .................. F16D 65/56
188/71.9
5,121,018 A 6/1992 Oldakowski
(Continued)

FOREIGN PATENT DOCUMENTS

| CN | 105952819 | | 9/2016 | | |
| DE | 2934396 | A * | 3/1981 | ............. | F16D 55/02 |
| DE | 102012010790 | A1 * | 12/2013 | ............. | F16D 55/28 |

OTHER PUBLICATIONS

Abstract for DE 2934396 (no date).*
(Continued)

*Primary Examiner* — Nicholas J Lane
(74) *Attorney, Agent, or Firm* — Renner, Otto, Boisselle & Sklar, LLP

(57) ABSTRACT

An electromagnetic brake assembly includes a solenoid coil; a fixed ferrous brake stator; a ferrous armature having a braking face, wherein the armature is moveable in a translation direction relative to the brake stator between a disengaged position and an engaged position; and a rotating member including a mating surface and that rotates relative to the armature when the armature is in the disengaged position. When the solenoid coil is energized, the armature translationally moves from the disengaged position to the
(Continued)

engaged position, and in the engaged position the braking face of the armature interacts with the mating surface of the rotating member to apply a braking force to the rotating member. The braking face and the mating surface may form a conical interface, and the conical interface further may include a friction O-ring positioned within a slot that permits the O-ring to roll along the braking interface when the armature moves between the disengaged position and the engaged position.

16 Claims, 16 Drawing Sheets

(51) Int. Cl.
    *A61H 3/00*     (2006.01)
    *F16D 121/20*     (2012.01)
    *F16D 127/02*     (2012.01)

(52) U.S. Cl.
    CPC ............ *A61H 2201/1215* (2013.01); *A61H 2201/1463* (2013.01); *A61H 2201/164* (2013.01); *A61H 2201/165* (2013.01); *A61H 2201/1671* (2013.01); *F16D 2121/20* (2013.01); *F16D 2127/02* (2013.01)

(58) Field of Classification Search
    CPC ........ A61H 2201/164; A61H 2201/165; A61H 2201/1671; F16D 63/002; F16D 2121/20; F16D 2127/02; H02K 7/102; H02K 7/1023; H02K 7/1025
    See application file for complete search history.

(56) References Cited

U.S. PATENT DOCUMENTS

| | | |
|---|---|---|
| 2013/0158444 A1 | 6/2013 | Herr et al. |
| 2013/0197408 A1 | 8/2013 | Goldfarb et al. |
| 2021/0207667 A1* | 7/2021 | Fichtner-Pflaum ..... F16D 59/02 |

OTHER PUBLICATIONS

Abstract for DE 102012010790 (no date).*
International Search Report and Written Opinion for corresponding International Application No. PCT/US2020/031308 mailed on Aug. 18, 2020.

* cited by examiner

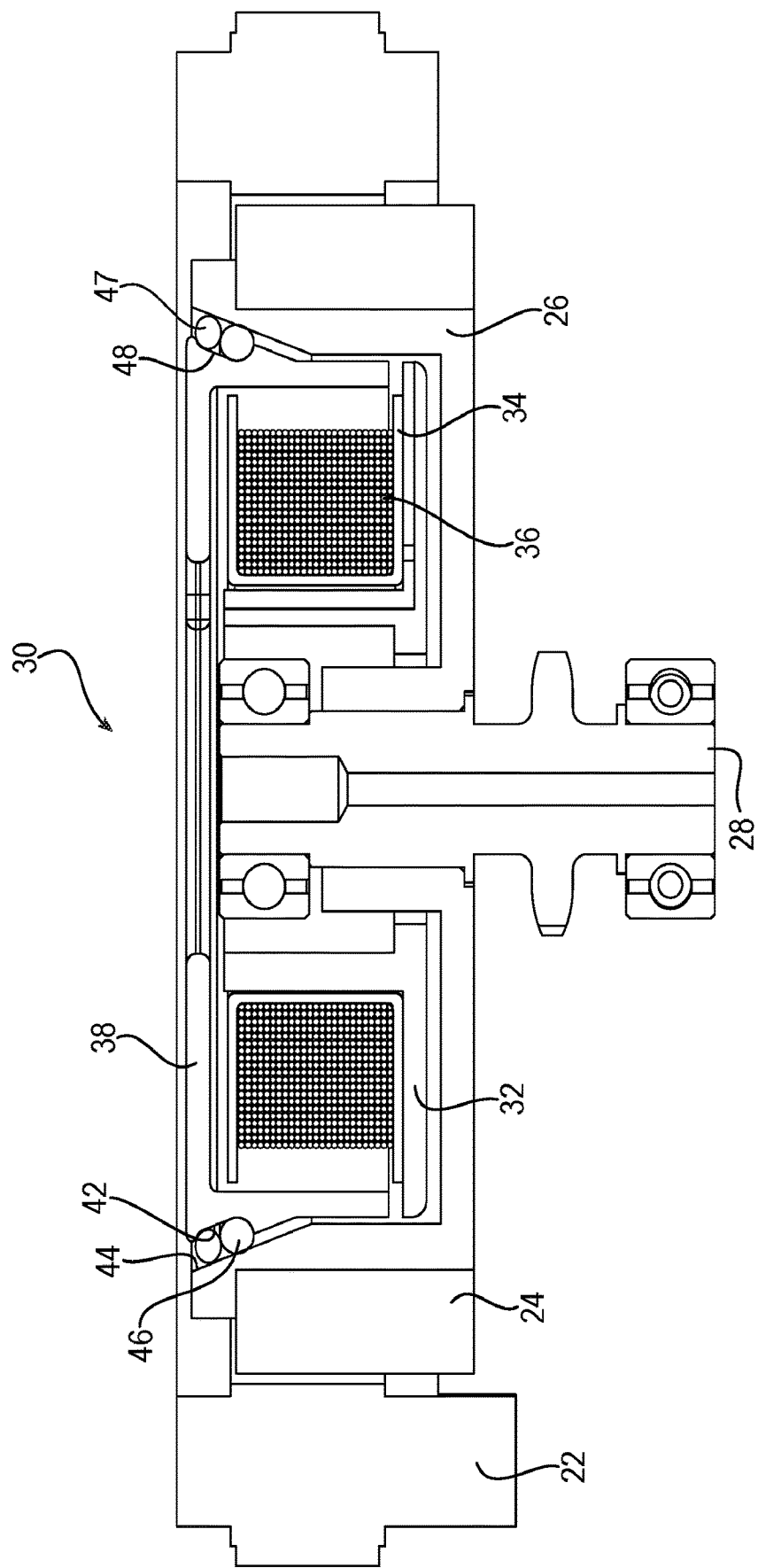

ELECTROMAGNETIC BRAKE FOR POWERED MOBILITY ASSISTANCE DEVICE

RELATED APPLICATIONS

This application is a national phase of International Application No. PCT/US2020/031308 filed May 4, 2020, which claims the benefit of U.S. Provisional Application No. 62/855,085 filed May 31, 2019, the contents of which are incorporated herein by reference.

FIELD OF INVENTION

The present application relates to powered mobility assistance devices, such as powered orthotic devices, and more particularly to braking mechanisms for braking the joint components of such devices.

BACKGROUND OF THE INVENTION

Many health conditions result in significant impairment to mobility, which may be associated with varying degrees of mobility impairment up to complete paralysis. The large population of persons afflicted with such conditions include, for example, those affected by stroke, multiple sclerosis, ALS, Parkinson's disease, spinal cord injury, cerebral palsy, and many other conditions resulting from birth defects, disease, injury, or aging. To aid mobility, mobility assistance devices, such as leg orthotic devices, have been employed.

Traditionally, the field of orthoses has specialized in highly custom, form-fitting braces that are made to fit the unique anatomy and needs of each individual patient. The simplest form of such a device is a passive non-powered orthotic device with a long-leg brace that extends over the knee and incorporates an ankle-foot orthoses to provide support at the ankle, which is coupled with the leg brace to lock the knee joint in full extension (referred to in the art as "knee-ankle-foot-orthoses" or "KAFOs"). In another configuration, the leg brace further may be connected to a hip component that provides added support at the torso (referred to in the art as "hip-knee-ankle-foot-orthoses" or "HKAFOs"). The hips are typically stabilized by the tension in the ligaments and musculature on the anterior aspect of the pelvis. Since almost all energy for movement is provided by the upper body, ambulation with these passive orthoses requires considerable upper body strength and a high level of physical exertion, and provide very slow walking speeds.

To decrease the high level of exertion associated with passive orthoses, the use of powered mobility assistance devices has been under development, which incorporate actuators and drive motors associated with a power supply to assist with locomotion. These powered mobility assistance devices have been shown to increase gait speed and decrease compensatory motions, relative to walking without powered assistance. The use of powered mobility assistance devices presents an opportunity for electronic control of the mobility assistance devices, for enhanced user mobility. For example, powered exoskeleton systems have been developed, which provide mobility assistance for persons with substantial to complete paralysis. Such systems incorporate two powered leg components connected with a hip component to provide bilateral mobility assistance at the hip and knee joints. An example of such an exoskeleton device is described in Applicant's International Patent Appl. No. PCT/US2015/023624 filed on Mar. 3, 2015. For lesser degrees of mobility impairment for which a full exoskeleton device is not warranted, a powered KAFO or HKAFO may be used. Examples of powered KAFO and HKAFO devices are described in Applicant's Provisional Patent App. No. 62/712,322 filed on Jul. 31, 2018.

Human walking is characterized by relatively slow hip and knee joint rotating motion and relatively high joint torque. To accommodate the characteristics of human walking in a powered mobility assistance device, either for partial or full assistance, competing interests include maximizing torque output and controllability while minimizing weight, size, noise, and cost. Recent advancements in brushless motor technology and lithium batteries have made electro-mechanical actuation systems the dominant option for optimizing these tradeoffs. Electric motors generally experience peak efficiency at relatively high rates of rotation and low torque output. This then requires a transmission system designed to reduce the speed and amplify the torque to bring the performance into a useful range for biomechanical assistance during walking. While speed-reduction/torque amplification transmissions help motors provide higher torques and lower speeds than they otherwise could, electric motors are still highly inefficient at extremely low speeds and at stall.

Attempts have made to address such deficiencies of powered mobility assistance devices by incorporating a braking mechanism to provide joint holding torque when the human joint is not in motion. Human gait includes a swing phase in which the leg is in motion (between toe-off and heel strike), and a stance phase in which the leg is anchored to the ground and proving support (between heel strike and toe-off). During the swing phase, the job of the stance knee joint is primarily to remain stiff and prevent buckling while the contra-lateral leg swings through. During this phase, a brake is a better device for providing static holding torque to the joint than the electric motor. The powered exoskeleton device described in Applicant's international application referenced above employs custom actuators that include a motor, a low transmission-ratio gearbox, and a solenoid friction brake that provides holding torque during this phase of gait, reducing the duty cycle of the electric motor. Executed properly, this can reduce overall electrical power requirements and can enable longer battery life for a battery-powered mobility assistance device, in addition to simply providing more holding torque for enhanced knee stability. Particularly for mobility assistance devices for persons with impairments less severe than complete paralysis, such as KAFO and HKAFO devices, there is an increased need for a smaller and lighter solution for powering and braking such systems.

Deficiencies of braking mechanisms that have been used in powered exoskeleton devices include the following: noisy engagement and disengagement; location of the solenoid outside of the motor, which takes up more space and adds bulk; radial, single-point contact on the rotating joint member leads to poor wear-performance; and limited holding torque due to force limitations on the spinning rotor of the motor. In particular, braking systems for mobility assistance devices typically have been designed in connection with exoskeletons for persons with severe impairments, which have a large size and substantial weight. Such braking systems have not proven to be suitable for use in mobility assistance devices for persons with impairments short of complete paralysis, such as for KAFO and HKAFO devices.

SUMMARY OF THE INVENTION

The present invention provides a brake assembly for a mobility assistance device that is more quiet, powerful, and low-profile as compared to conventional configurations, and which has optimal wear performance. The brake assembly may be incorporated into various types of powered mobility assistance devices, and in particular is suitable for use in mobility assistance devices for persons with impairments short of complete paralysis, such as KAFO and HKAFO devices. In exemplary embodiments, therefore, the brake assembly may provide holding torque to stabilize a human limb in a controllable manner during walking. In addition, although the brake assembly of the present application is described in connection with an actuator assembly that drives a joint member in a powered mobility assistance device, the brake assembly is not limited to such usage. Rather the brake assembly configurations of the present application may be suitable for any application in which the braking of a rotating member is desired.

The brake assembly described in the current application is configured as a controllable electromagnetic brake. The brake assembly is designed with an integrated solenoid coil that provides a linear force from supplied electric power. The linear force is applied to create contact between a rotating member that is fixed to a motor rotor of the motor and a translating member that acts as a brake, and the friction between the rotating member and the translating member causes the braking effect. The brake assembly, including the solenoid and friction components, are located in an axially concentric manner within the rotating member of the motor, and may be located between inner and outer diameters of a hollow rotating member such as a motor spindle. The brake assembly provides a high holding torque with minimal electrical power input and engages and disengages in a quiet and discrete manner.

In exemplary embodiments, the solenoid components include a mounted static stator with an attached coil bobbin, and a moveable translating armature. The bobbin is made of a non-conducting material, such as for example an acrylonitrile butadiene styrene (ABS) plastic, and is wrapped with multiple turns of magnet wire. The armature may be rotatably constrained by top-facing holes that align with mating pins in the actuator top frame, and the armature may move translationally along the mating pins. When energized, the coil creates a magnetic field that draws the armature toward the brake stator. As the armature moves toward the stator, the armature interacts with the rotating member of the motor, such as a rotor spindle. When the armature is constrained from rotating, this contact creates friction that provides braking torque. In an alternative embodiment, the rotating constraints on the armature may be removed, thereby creating a clutch mechanism rather than a brake, as contact between the armature and the rotating rotor spindle would cause the armature to begin rotating, rather than the spindle ceasing to rotate.

Various braking interfaces may be implemented by which the armature interacts with the rotor spindle. In an exemplary embodiment, the braking interface is a simple face contact against an installed ring of friction material. In another exemplary embodiment, the interface may be a conical interface by which a conical face in the armature interacts against an opposing tapered mating surface in the rotor spindle, which could serve to increase the frictional normal force provided during the interaction. In another conical embodiment, a groove or multiple grooves is/are cut circumferentially in the armature to allow installation of an O-ring or multiple O-rings. These O-rings are sized and selected to optimize friction and wear properties, and may be chosen for other characteristics such as chemical tolerance.

In an exemplary embodiment that employs an O-ring, the groove that receives the O-ring may be elongated into a wider slot, which permits the O-ring to slide or roll within the slot up the slope of the conical interface as the armature descends into the rotor spindle mating surface. As the O-ring rolls up the conical interface, the O-ring is stretched, and therefore is storing energy. When the solenoid is de-energized, the stored energy in the stretched O-ring is released and urges the O-ring to retract back to the initial position, assisting in the disengagement of the armature from the rotor spindle. This helps ensure that the brake assembly will not lock or stick in the engaged position. Properly sized and angled, the rolling O-ring effect can allow more of the armature linear force to translate to normal force against the conical interface, and thus maximize holding friction obtained for a given solenoid force.

As an alternative embodiment to frictional engagement, the mating surfaces of the armature and rotor spindle may be configured to interact by positive engagement through sets of interlocking features, such as interlocking teeth, to provide a mechanical interference. This mechanical interference could significantly increase the brake holding torque and/or significantly decrease the linear force required from the solenoid to achieve a certain holding torque. The interfering mechanical features could be designed such that they are self-locking, or could be designed such that they could be made to slip at a certain level of torque, thus creating a torque-limiting brake/clutch mechanism.

An aspect of the invention, therefore, is an electromagnetic brake assembly that provides a holding torque to a rotating member. In exemplary embodiments, the brake assembly includes a solenoid coil; a fixed ferrous brake stator; a ferrous armature having a braking face, wherein the armature is moveable in a translation direction relative to the brake stator between a disengaged position and an engaged position; and a rotating member including a mating surface and that rotates relative to the armature when the armature is in the disengaged position. When the solenoid coil is energized, the armature translationally moves from the disengaged position to the engaged position, and in the engaged position the braking face of the armature interacts with the mating surface of the rotating member to apply a braking force to the rotating member. In an alternate embodiment, the armature could be nominally held against the rotating member (in the braking position) by a spring element. In this configuration, energizing the coil would serve to retract the armature and release the holding force. This configuration would be considered a "normally-locked" brake/clutch.

Any one of a variety of braking interfaces may be employed. The braking face of the armature may be a conical face and the mating surface of the rotating member may be a tapered surface opposing the conical face to form a conical braking interface. The brake assembly further may include a friction O-ring disposed within a groove at the conical interface between the conical face of the armature and the opposing tapered mating surface of the rotating member. The groove may be configured as an elongated slot, and the friction O-ring rolls within the slot along the conical interface as the armature moves between the disengaged position and the engaged position. The braking face of the armature may be a planar face and the mating surface of the rotating member may be a planar surface opposing the planar face to form a braking interface, and a friction material may be located at the braking interface between the planar face of the armature and the opposing planar mating surface of the rotating member. The braking face of the armature may include first interlocking features and the mating surface of the rotating member may include second interlocking features that are opposing to the first interlocking features, such as interlocking triangular teeth, and when the armature is in the engaged position the first and second interlocking features interlock to form a mechanical interference braking interface.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

BRIEF DESCRIPTION OF THE DRAWINGS

FIG. 4A is a drawing depicting a brake assembly configuration that is a variation on the embodiment of FIG. 4.

DETAILED DESCRIPTION

Figure 1:
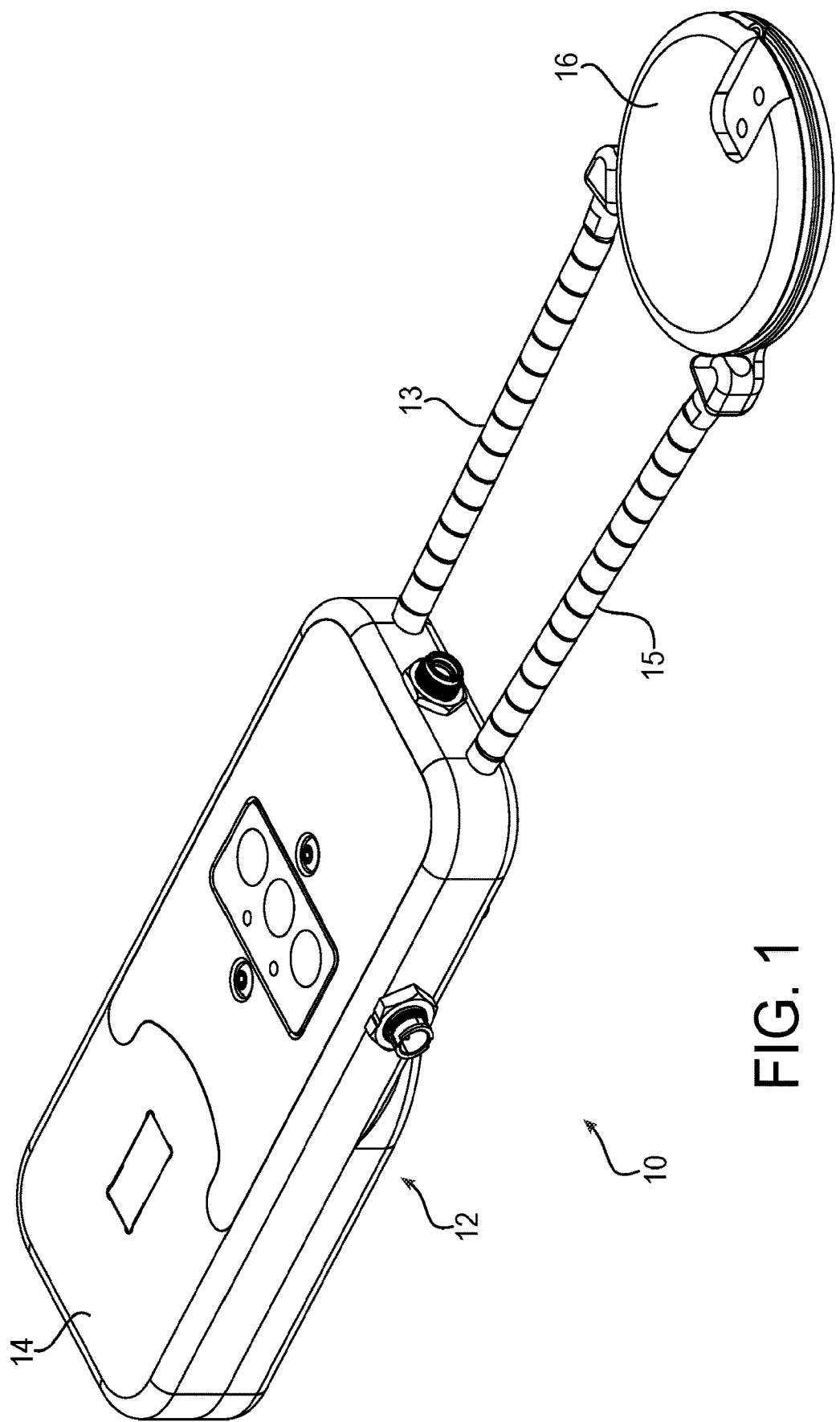
FIG. 1 is a drawing depicting an isometric view of an exemplary actuator system for use with a mobility assistance device, in accordance with embodiments of the present invention.

Embodiments of the present application will now be described with reference to the drawings, wherein like reference numerals are used to refer to like elements throughout. It will be understood that the figures are not necessarily to scale.

FIG. 1 is a drawing depicting an isometric view of an exemplary actuator system 10 for use with a powered mobility assistance device. The actuator system 10 includes an actuator assembly 12 that is housed within an actuator housing 14, and a driven joint member 16. The driven joint member 16 is remotely connected from the actuator assembly 12 by flexible cabling, which may be configured as a pair of Bowden cable sheaths 13 and 15 that include respective Bowden cables. The actuator system 10 may be incorporated into various types of powered mobility assistance devices, and in particular is suitable for use in mobility assistance devices for persons with impairments short of complete paralysis, such as KAFO and HKAFO devices.

Figure 2:
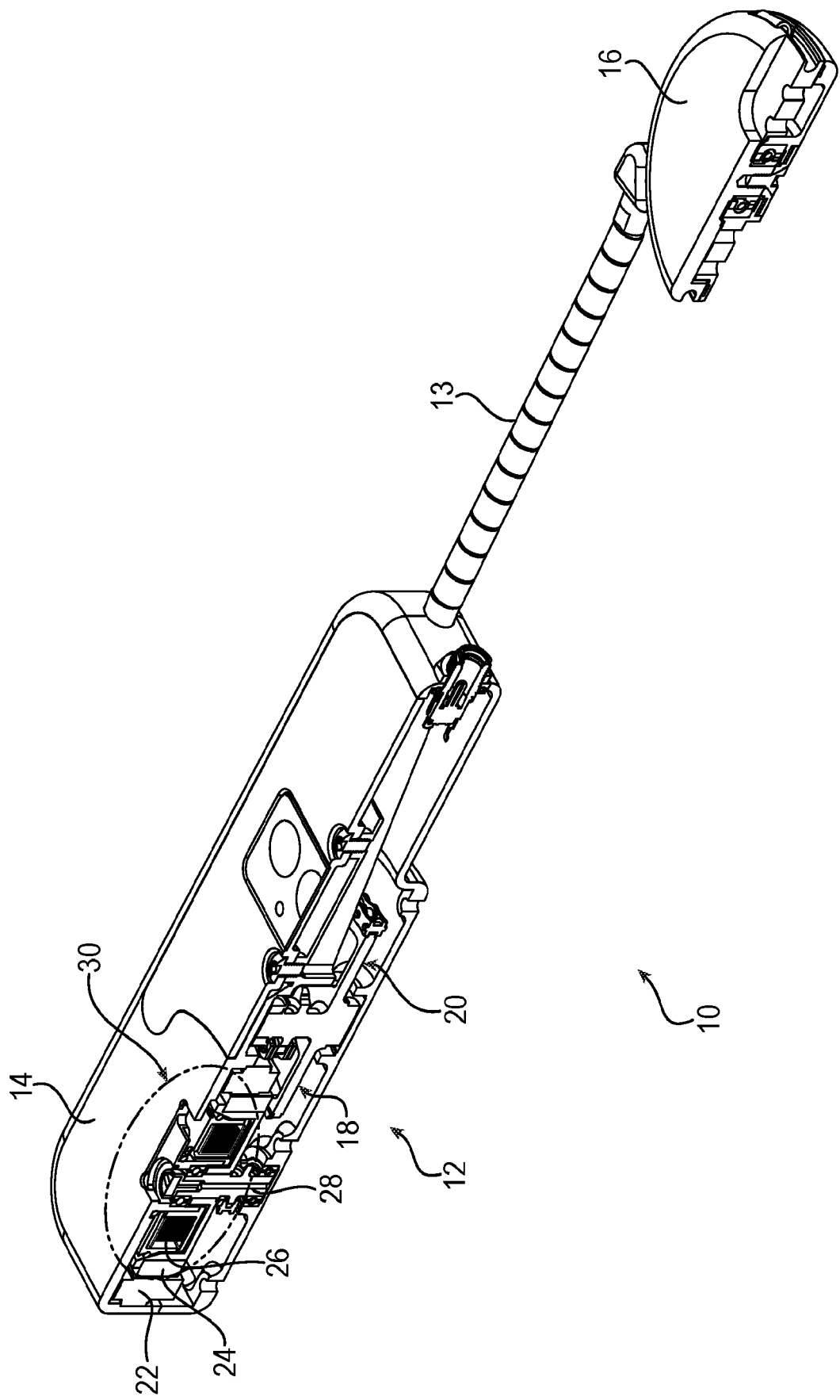
FIG. 2 is a drawing depicting an isometric and cross-sectional view of the exemplary actuator system of FIG. 1.
Figure 3:
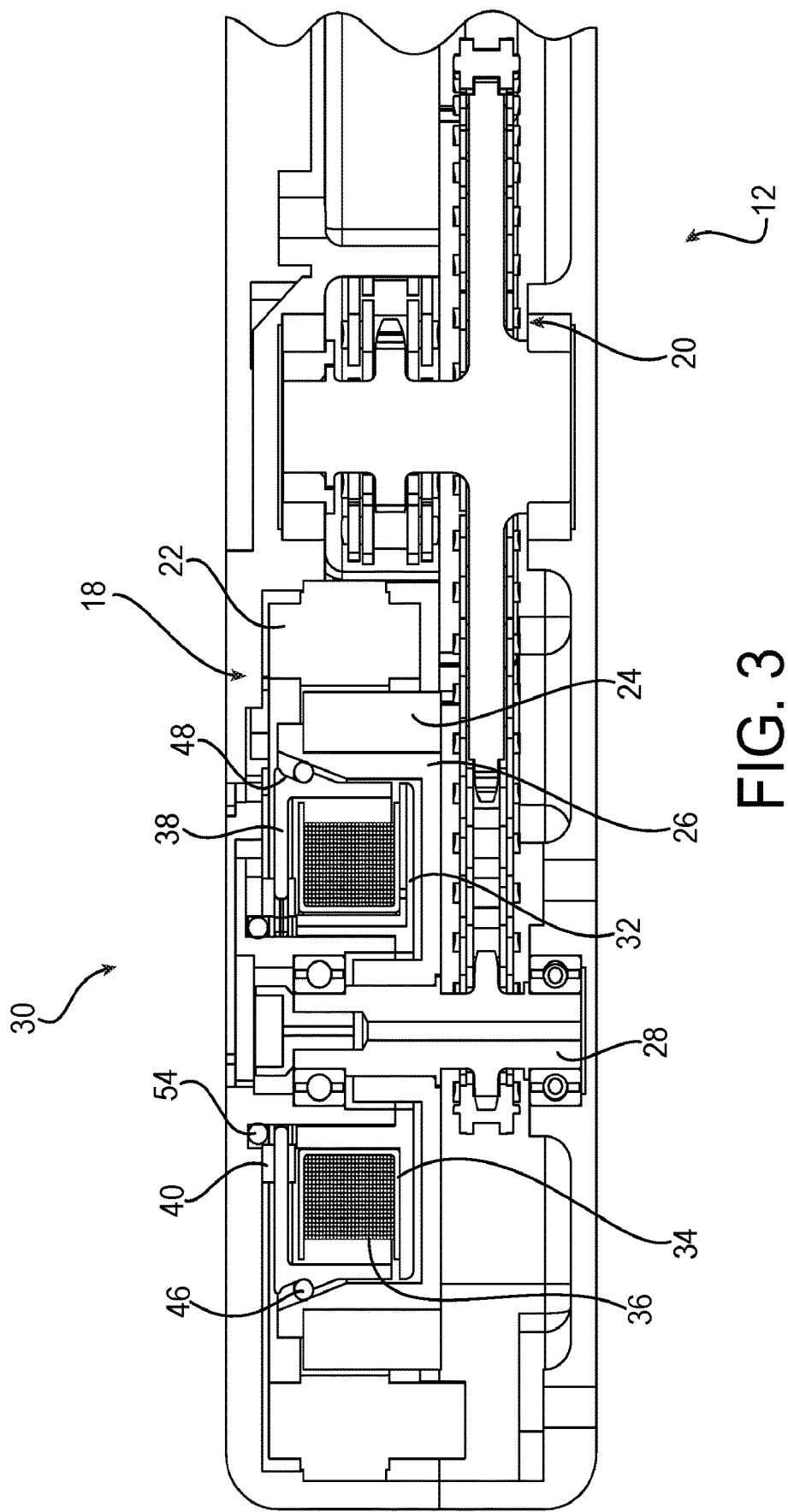
FIG. 3 is a drawing depicting a cross-sectional view specifically of the actuator assembly portion of the actuator system of FIG. 1.

FIG. 2 is a drawing depicting an isometric and cross-sectional view of the exemplary actuator system 10 of FIG. 1, and FIG. 3 is a drawing depicting a cross-sectional view specifically of the actuator assembly 12 portion of the actuator system. Generally, the actuator assembly components include a motor 18 and a transmission system 20 that operates to drive the joint member 16. The actuator assembly 12 is configured as a high torque, low profile actuator with the motor 18 configured as a flat electric motor, and the transmission system 20 is configured as a multi-stage speed reduction drive transmission. Examples of suitable transmission systems 20 and driven joint members 16 are described in Applicant's Provisional Patent App. No. 62/712,322 filed on Jul. 31, 2018, referenced above and incorporated here by reference. In addition, the motor 18 may be a brushless DC motor that includes a fixed motor stator 22 and a motor rotor 24 that rotates relative to the motor stator 22. The motor rotor 24 is fixed to a rotating rotor spindle 26 that rotates with the motor rotor. The rotor spindle 26 further is fixed to an output shaft 28, and the motor output speed corresponding to the rotational speed of the output shaft is reduced by the transmission system 20 for driving the driven joint member 16. Although shown as separate components in the exploded view of FIG. 5, in exemplary embodiments, the rotor spindle 26 and output shaft 28 may be formed as a single or unitary component. The actuator assembly 12 further may include various housing components, fixing components (bolts, screws, fasteners), and the like as may be suitable for use in any particular mobility assistance device.

In accordance with embodiments of the present application, the actuator system 10 includes an enhanced brake assembly 30 that is incorporated into the actuator assembly 12. The brake assembly 30 provides joint holding torque when the human joint is not in motion and thus rotation of the driven joint member is halted. As referenced above, human gait includes a swing phase in which one leg is in motion, and a stance phase in which both feet are in contact with the ground. During the swing phase, the job of the stance knee joint is primarily to remain stiff and prevent buckling while the contra-lateral leg swings through. During this phase, the brake assembly 30 provides static holding torque to the knee joint of the stance leg with each step, which reduces the duty cycle of the electric motor. The brake assembly thus reduces overall electrical power requirements and can enable longer battery life for a battery-powered mobility assistance device. Particularly for mobility assistance devices for persons with impairments short of complete paralysis, such as KAFO and HKAFO devices, the brake assembly 30 provides a smaller and lighter braking solution for controlling such systems as compared to conventional brake configurations.

An aspect of the invention, therefore, is an electromagnetic brake assembly that provides a holding torque to a rotating member. In exemplary embodiments, the brake assembly includes a solenoid coil; a fixed ferrous brake stator; a ferrous armature having a braking face, wherein the armature is moveable in a translation direction relative to the brake stator between a disengaged position and an engaged position; and a rotating member including a mating surface and that rotates relative to the armature when the armature is in the disengaged position. When the solenoid coil is energized, the armature translationally moves from the disengaged position to the engaged position, and in the engaged position the braking face of the armature interacts with the mating surface of the rotating member to apply a braking force to the rotating member. In exemplary embodiments, the braking face and the mating surface may form a conical interface, and the conical interface further may include a friction O-ring positioned within a slot that permits the O-ring to roll along the braking interface when the armature moves between the disengaged position and the engaged position.

Figure 4:
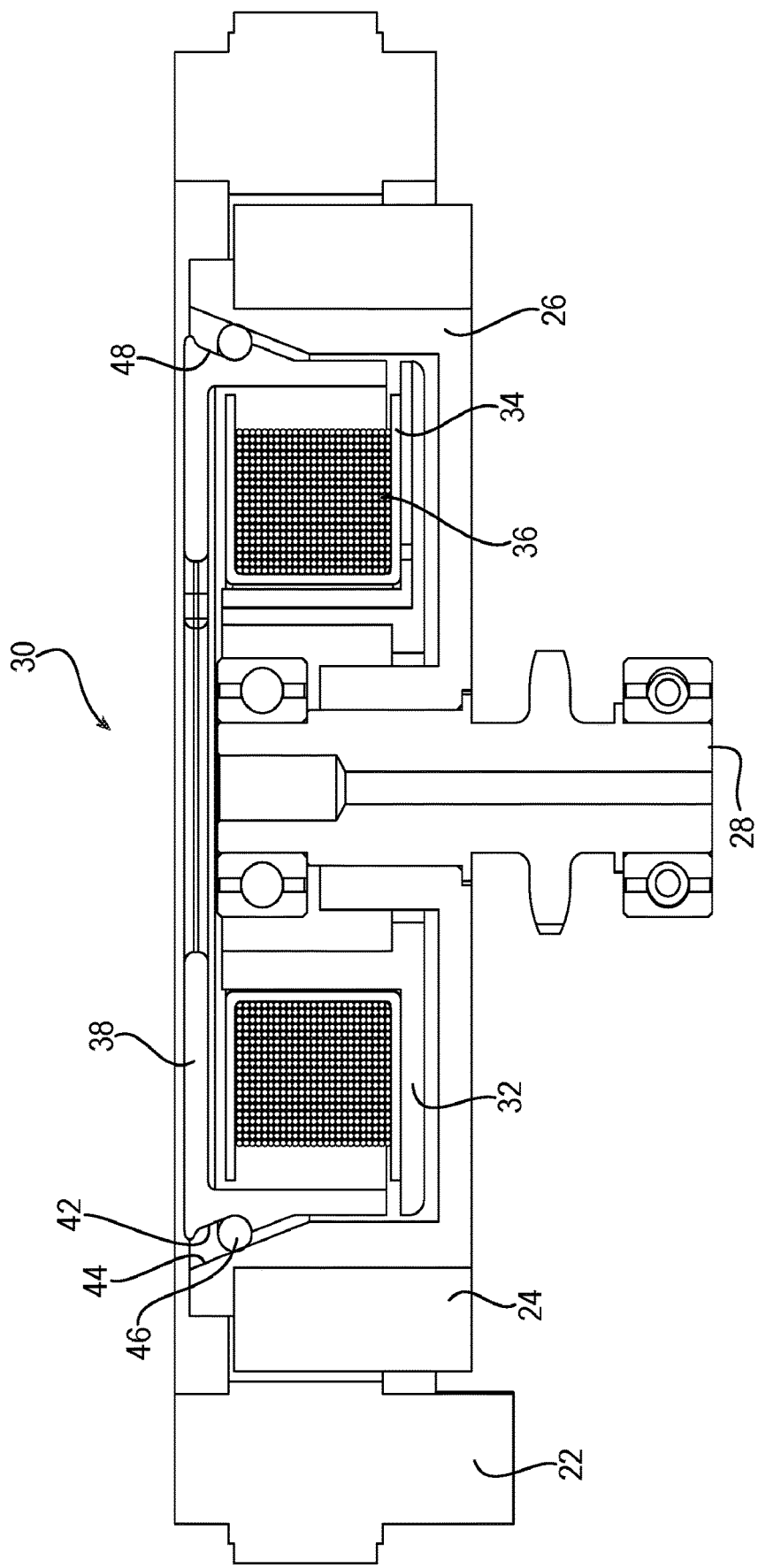
FIG. 4 is a drawing depicting a brake assembly and related motor components of the actuator assembly of FIGS. 2 and 3 in isolation.
Figure 5:
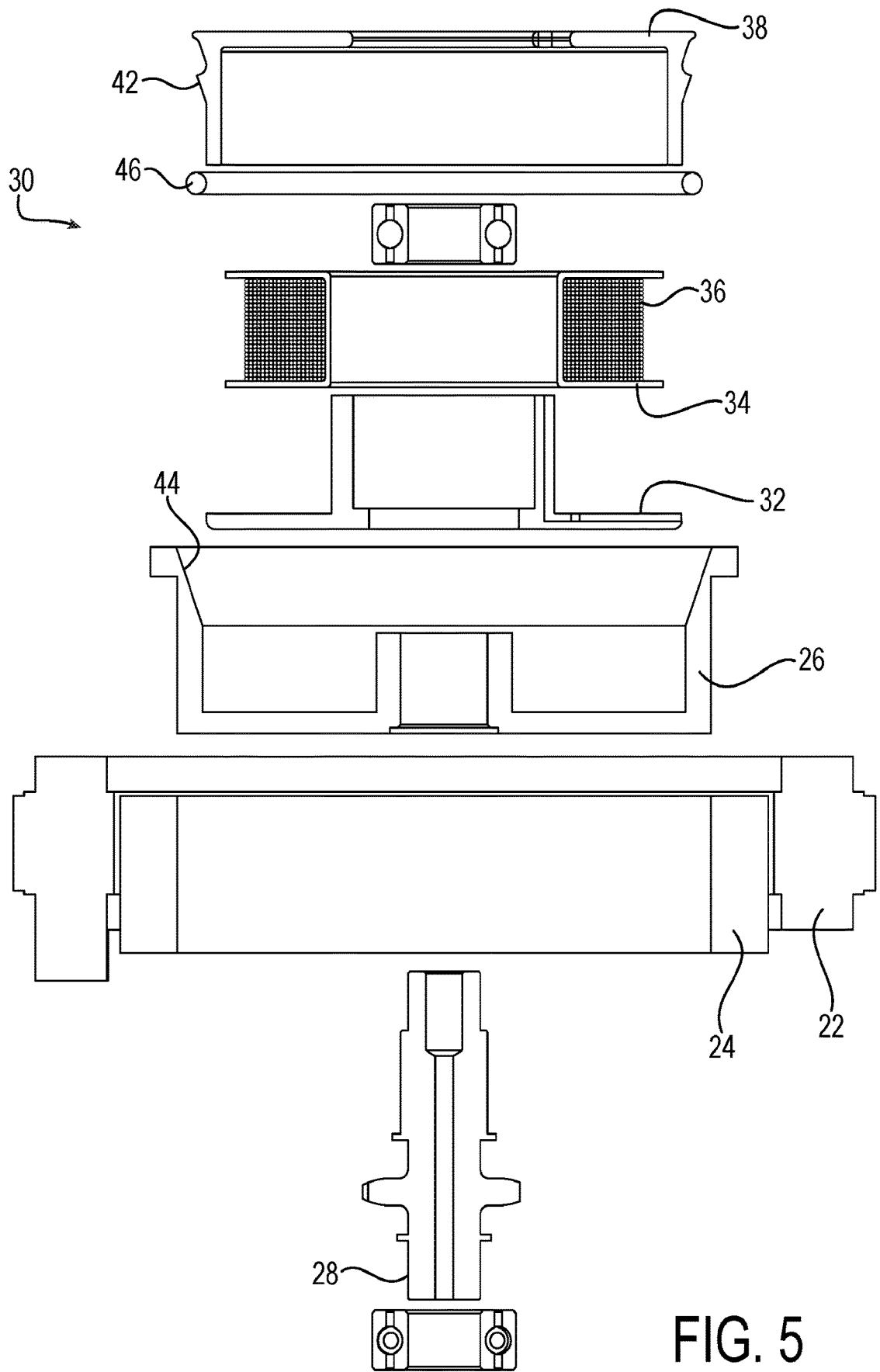
FIG. 5 is a drawing depicting an exploded view of the brake assembly and related motor components of FIG. 4.

FIG. 4 is a drawing depicting the brake assembly 30 and related motor components of the actuator assembly of FIGS. 2 and 3 in isolation. FIG. 5 is a drawing depicting an exploded view of the brake assembly 30 and related motor components of FIG. 4. Generally, the brake assembly 30 is configured as a controllable electromagnetic brake. The brake assembly includes an integrated solenoid coil that provides a linear force from supplied electric power. The linear force is applied to create an interaction between a rotating member of the motor, such as the rotor spindle, and a translating member that acts as a brake, and the friction between the rotating member and the translating member causes the braking effect. The brake assembly, including the solenoid and friction components, are located in an axially concentric manner within the motor rotor 24, and particularly may be located between inner and outer diameters of the rotor spindle 26 which may be configured as a hollow rotating member. The brake assembly 30 provides a high holding torque with minimal electrical power input and engages and disengages in a quiet and discrete manner.

In exemplary embodiments, the solenoid components of the brake assembly 30 include a mounted and fixed static brake stator 32 made of a ferrous material. The brake stator 32 is attached to a coil bobbin 34 onto which a wire coil 36 is wound. The brake assembly 30 further includes a moveable translating armature 38 also made of a ferrous material. The bobbin 34 is made of a non-conducting (non-ferrous) material, such as for example an acrylonitrile butadiene styrene (ABS) plastic, and is wrapped with multiple turns of magnet wire to form the wire coil 36. As referenced above, the brake stator 32 and the armature 38 are made of a magnetically attractive ferrous material, such as a ferrous metal material, for electromagnetic brake operation. The armature 38 may be rotatably constrained by top-facing holes that align with mating pins 40 located in the actuator housing 14, and the armature may move translationally along the mating pins 40. The anti-rotation features including the mating pins are described in more detail below in connection with additional figures.

When energized, the wire coil 36 creates a magnetic field that draws the ferrous armature 38 toward the ferrous brake stator 32. The driving energy may be inputted as a modulated half voltage square wave, which provides a suitable input driving waveform to operate the solenoid braking mechanism. As the armature moves toward the brake stator, the armature interacts against a rotating member of the motor, such as the rotor spindle 26. The rotor spindle 26 may be made of any suitable non-ferrous rigid material, such as a non-magnetic metal material for providing a high friction braking interface, such as for example stainless steel, aluminum or the like. Because the armature is constrained from rotating in this embodiment, the interaction of the armature against the rotor spindle creates friction that provides braking torque. In an alternative embodiment, the rotating constraints on the armature may be removed, thereby creating a clutch mechanism rather than a brake, as the interaction between the armature and the rotating rotor spindle would cause the armature to begin rotating, rather than the spindle ceasing to rotate.

In exemplary embodiments, to enhance the braking release the solenoid coil is bi-directional, whereby a reverse current may be applied to the wire coil 36 instead of just de-energizing the wire coil. There is potential for the stator and armature components to become permanently magnetized to some degree, which can impede release of the components thereby resulting in a sticking force that has a tendency to maintain the braking state. To address such potential deficiency, a reverse current pulse is applied to substantially remove any residual magnetism of the stator and armature, which in turn accelerates the release of the braking mechanism. The result is a faster and smoother brake cycling as compared to when the wire coil is simply de-energized.

Various braking interfaces may be implemented by the armature 38 interacting with the rotor spindle 26. In an exemplary embodiment as illustrated best in FIGS. 4 and 5, the braking interface may be conical interface formed by a conical face in the armature and an opposing tapered mating surface in the rotor spindle. In a conical braking interface configuration, the braking interface includes a conical face 42 located on the armature 38, and an opposing tapered mating surface 44 located on the rotor spindle 26 that opposes the armature conical face 42. The conical face 42 and the tapered mating surface 44 each has a taper angle relative to a vertical normal in the figures. In exemplary embodiments, the taper angle may be 15° to 30° relative to normal. In addition, the taper angles of the conical face 42 and the tapered mating surface 44 need not match each other. In exemplary embodiments, as the receiving component the taper angle of the tapered mating surface 44 may be greater than the tapered angle of the conical face 42, which can reduce the propensity for jamming.

In this particular embodiment, the braking interface further includes a friction O-ring 46 that is positioned between the conical face 42 of the armature 38 and the mating surface 44 of the rotor spindle 26. The friction O-ring 46 may be made of an elastomer material of a durometer selected to increase the friction force of the interaction of the opposing conical interface surfaces of the armature and rotor spindle. Urethan materials may be employed as an example O-ring material. Using the friction O-ring 46 serves to increase the frictional normal force provided during interaction of the opposing conical interface surfaces as compared to a direct metal-to-metal contact. A groove or multiple grooves is/are cut circumferentially in the armature to allow installation of the O-ring 46 or multiple O-rings. These O-rings are sized and selected to optimize friction and wear properties, and may be chosen for other characteristics such as chemical tolerance.

In the exemplary embodiment that is illustrated particularly in FIGS. 2-5, the groove that receives the O-ring 46 may be elongated into a wider slot 48, which permits the O-ring 46 to slide or roll within the slot 48 up the slope of the conical interface as the armature descends into the mating surface 44 of the rotor spindle 26. As the O-ring 46 rolls up the conical interface, the O-ring is stretched, and therefore is storing energy. When the solenoid is de-energized, the stored energy in the stretched O-ring is released and urges the O-ring to retract back to the initial position, assisting in the disengagement of the armature 38 from the rotor spindle 26. This helps ensure that the brake assembly will not lock or stick in the engaged position. Properly sized and angled, the rolling O-ring effect can allow more of the armature linear force to translate to normal force at the conical interface, and thus maximize holding friction obtained for a given solenoid force. In this regard, as referenced above the taper angle of the tapered mating surface 44 may be greater than the tapered angle of the conical face 42, which can reduce the propensity for jamming as the energy of the stretched O-ring is released.

FIG. 4A is a drawing depicting a brake assembly configuration that is a variation on the embodiment of FIG. 4. In this variation, the brake assembly 30 further includes a second friction O-ring disposed 47 within a groove at the conical interface between the conical face 42 of the armature 38 and the opposing tapered mating surface 44 of the rotor spindle 26, in combination with the first O-ring 46 of previous embodiments. The second O-ring 47 may either be essentially fixed, or the second O-ring 47 may be a rolling O-ring that rolls in a slot comparably as the first O-ring 46. The second friction O-ring 47 similarly may be made of an elastomer material of a durometer selected to increase the friction force of the interaction of the opposing conical interface surfaces of the armature and rotor spindle. Urethan materials may be employed as an example O-ring material. Using the second friction O-ring 47 serves to increase even further the frictional normal force provided during interaction of the opposing conical interface surfaces as compared to a direct metal-to-metal contact.

Figure 6:
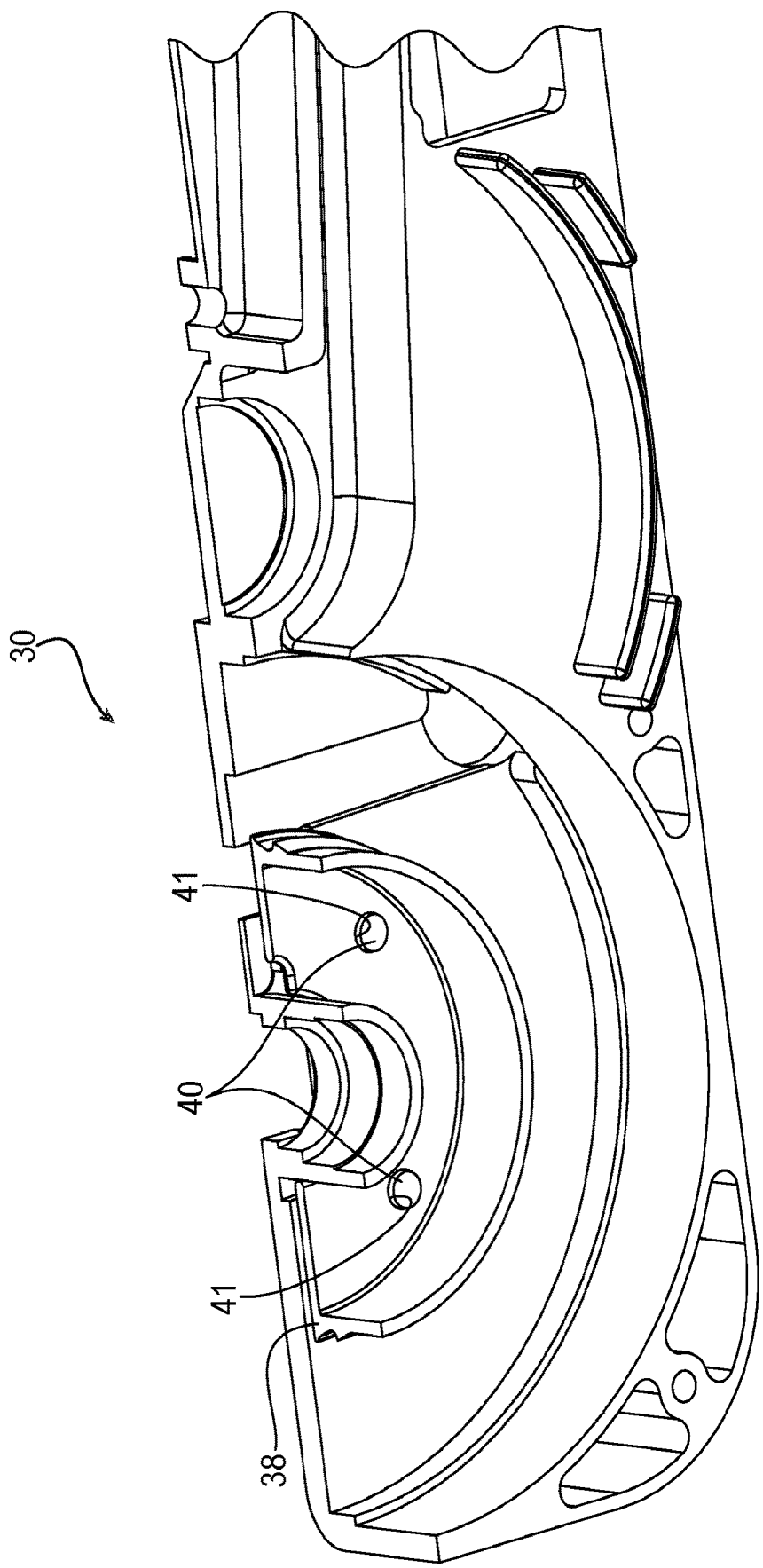
FIG. 6 and FIG. 7 are drawings depicting related partial isometric and cross-sectional views of the portion of the actuator assembly that includes the brake assembly, illustrating anti-rotation features associated with the brake armature.
Figure 7:
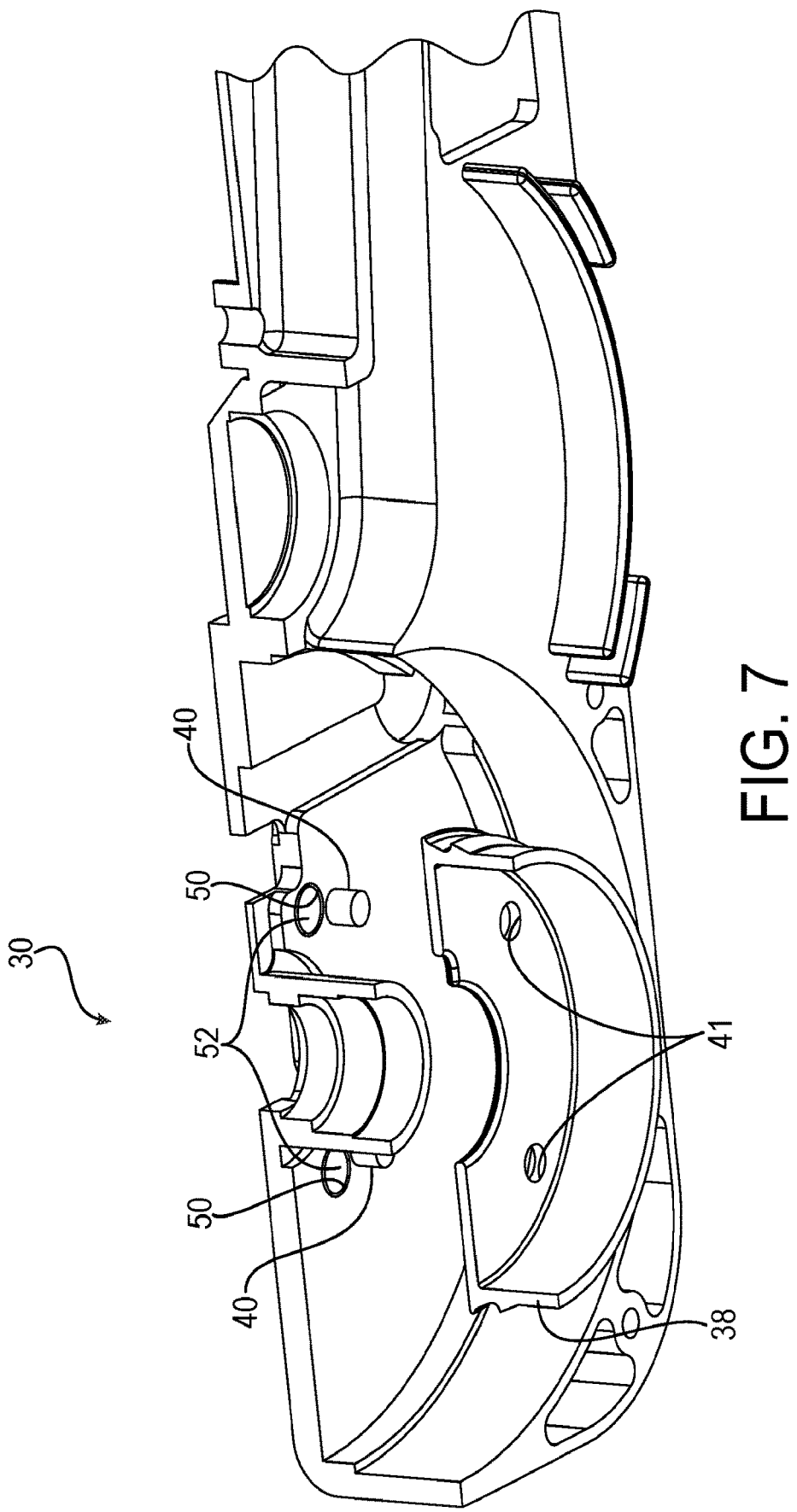

As referenced above, to provide an enhanced braking action the armature 38 may be constrained against substantial rotational motion. Such anti-rotation features are illustrated in more detail in FIGS. 6 and 7. FIGS. 6 and 7, therefore, are drawings depicting partial isometric and cross-sectional views of the portion of the actuator assembly 12 that includes the brake assembly 30. The top portion or top frame of the actuator housing 14 of the actuator assembly 12 includes a plurality of mating holes 41 that extend through the actuator housing and through the armature 38. The mating holes 41 receive the mating pins 40 referenced above, and the mating pins 40 are fixed to the housing 14 within the mating holes 41. Because the mating pins 40 are fixed within the housing 14, the armature cannot rotate substantially but can move translationally along the mating pins. The mating pins 40 may be made of any suitable material, such as a metal or rigid plastic, and the material is selected to permit the translational movement of the armature 38 along the mating pins 40 with minimal resistance. Any suitable number of mating pins may be employed as deemed appropriate for a particular actuator system or other application.

Although substantial rotation of the armature 38 is prevented by the anti-rotation features 40 and 41, in exemplary embodiments a small or slight degree or amount of rotation of the armature is permitted. A slight degree of permissible rotation of the armature may be advantageous to reduce the propensity for the brake to stick during disengaging the brake. A slight degree of permissible rotation of the armature also may relieve torque load on the brake during brake release, which reduces component wear by disengaging the brake while not under load. In particular, to permit a slight rotation of the armature the mating holes 41 may be sized relative to the mating pins 40 so as to permit a small amount of "give" or "wiggle room" of the mating pins within the mating holes. In an exemplary embodiment, the anti-rotation features may permit a degree of rotation of the armature of about one to five degrees. This small amount of rotation, for example, may be permitted by elongating the mating holes in a radial direction of the armature, or by configuring the mating holes with a diameter sized larger than a diameter of the mating pins in an amount sufficient to permit the referenced degree of rotation.

As shown particularly in FIG. 7, the actuator housing 14 further may include a plurality of pockets 50 that are configured respectively to receive a corresponding plurality of magnets 52. The magnets 52 assert a magnetic force on the armature 38, which causes the armature 38 to retract when the wire coil 36 is de-energized. The magnets 52 may be configured as neodymium disk magnets, and any suitable number of magnets 52 may be employed. Furthermore, as seen particularly by referring back to FIG. 3, the brake assembly 30 of the actuator assembly 12 further may include an additional cushion O-ring 54 that is embedded within the housing 14 above the armature 38. The cushion O-ring 54 is may be made of a flexible elastomeric material, and operates to cushion the retraction of the armature to reduce noise and wear when the armature retracts.

Variations on the braking interface described above may be employed. The variations may represent a trade-off between complexity and braking performance. In the following figures and related description, like components are identified by like reference numerals.

Figure 8:
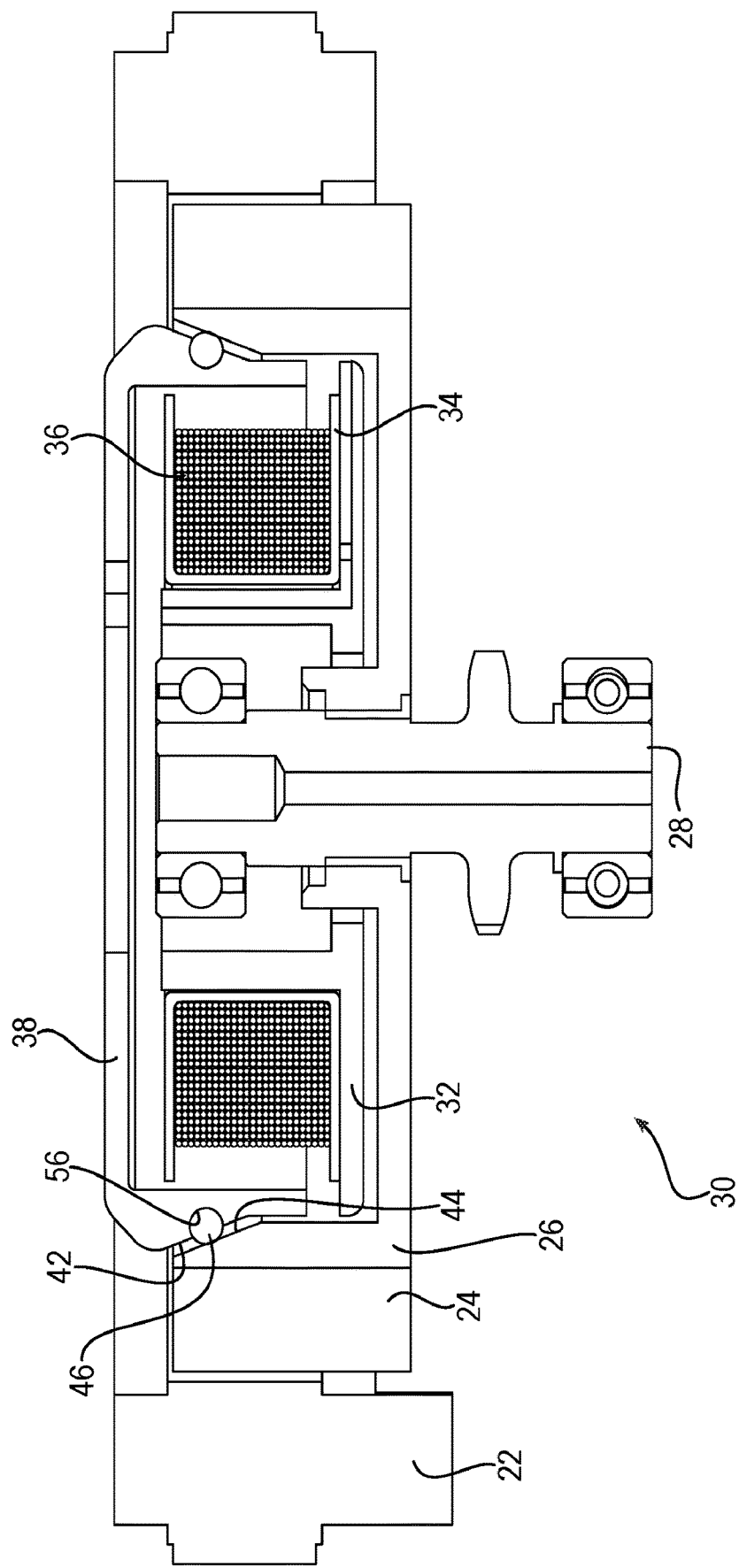
FIG. 8 is a drawing depicting a variation of the braking interface employed by the brake assembly.

FIG. 8 is a drawing depicting a variation of the braking interface employed by the brake assembly 30. In this variation, the friction O-ring 46 is positioned tightly within a retention groove 56 (rather than within the wider slot 48 of the previous embodiment). Accordingly, the machining required for this configuration is less complex, and the enhanced friction performance by use of the friction O-ring 46 is maintained. The reduced complexity, however, foregoes the benefits of the previous embodiment that result from the friction O-ring 46 being able to roll within the slot 48 along the conical interface between the conical face 42 of the armature 38 and the opposing tapered surface 44 of the rotor spindle 26.

Figure 9:
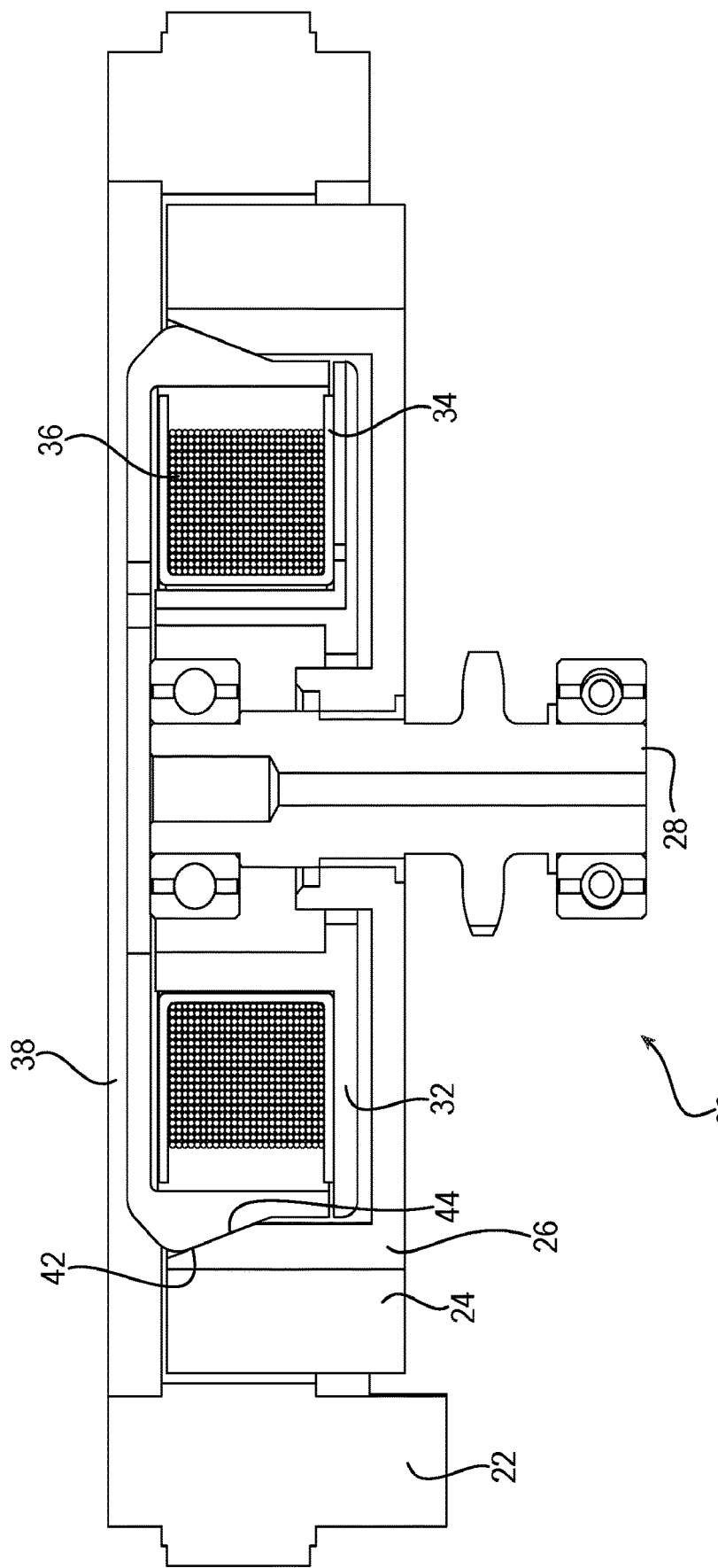
FIG. 9 is a drawing depicting another variation of the braking interface employed by the brake assembly.

FIG. 9 is a drawing depicting another variation of the braking interface employed by the brake assembly 30. In this exemplary embodiment, the braking interface is a simple face contact between a friction surface of the armature 38 and an opposing mating surface of the motor spindle 26, i.e., the friction O-ring 46 is not used. This embodiment, therefore, is less complex by having fewer components, but foregoes the enhanced friction performance provided by the use of the friction O-ring 46. In the example of FIG. 9, a conical interface still is employed, by which the conical face 42 of the armature 38 interacts against the opposing tapered mating surface 44 of the motor spindle 26. Accordingly, the conical interface of FIG. 9 employs a direct contact interaction by which the conical face 42 interacts directly against the mating surface 44. A cone/taper angle of approximately 20° relative to a vertical normal line has been demonstrated to be a suitable angle of the conical interface, although any suitable angle may be employed depending upon a particular application.

Figure 10:
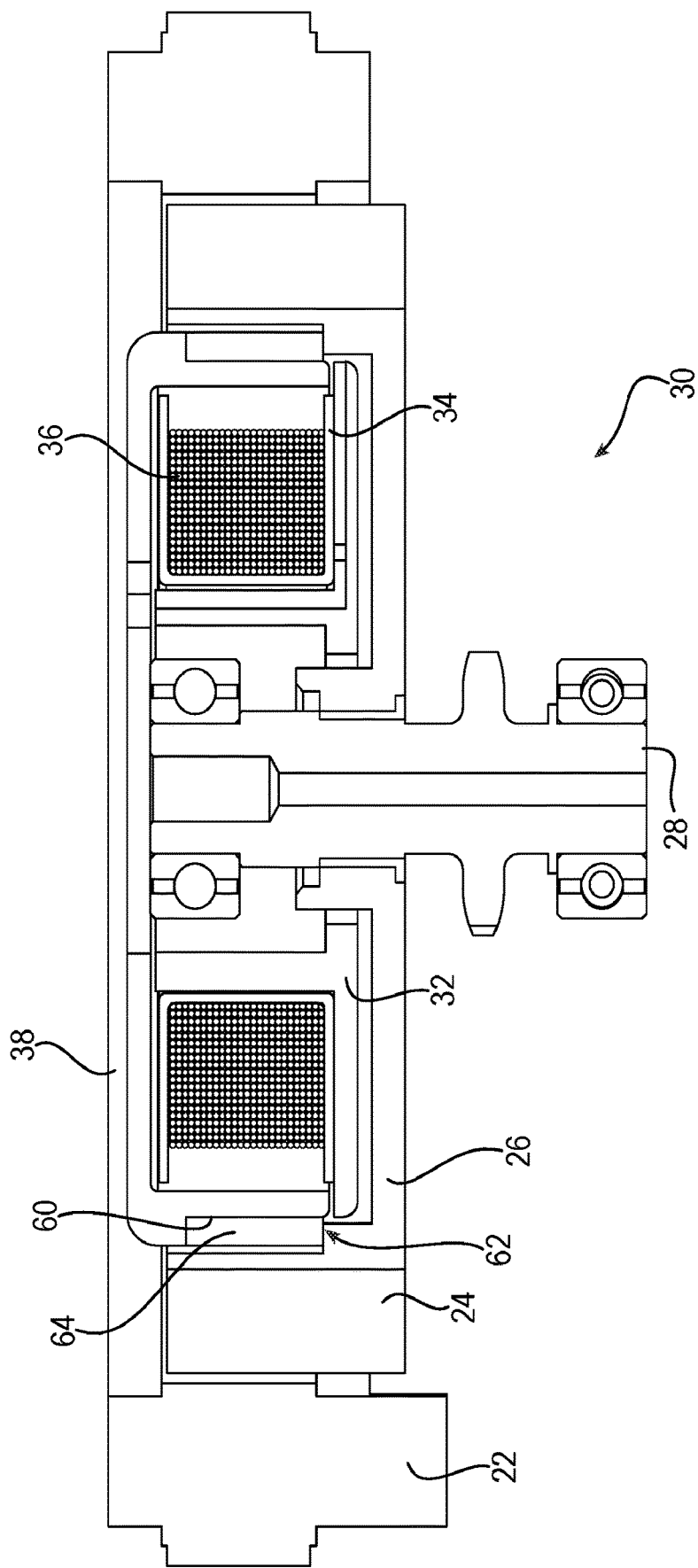
FIG. 10 is a drawing depicting another variation of the braking interface employed by the brake assembly.

FIG. 10 is a drawing depicting another variation of the braking interface employed by the brake assembly 30. As illustrated in the embodiment of FIG. 10, shaped interfaces other than conical may be employed. In this example, a planar face 60 of the armature 38 interacts with an opposing planar mating surface 62 of the motor spindle 26. Different shaped interfaces may be employed and represent a consideration of wear performance, friction performance, and ease of manufacture. In addition, in the example of FIG. 10, an additional ring of friction material 64 may be affixed to the planar face 60 of the armature 38 to enhance the friction performance. The friction material 64 may be made of any suitable material, such as a material comparably as the friction O-ring 46 of previous embodiments, to enhance the friction interaction with reduced wear.

Figure 11:
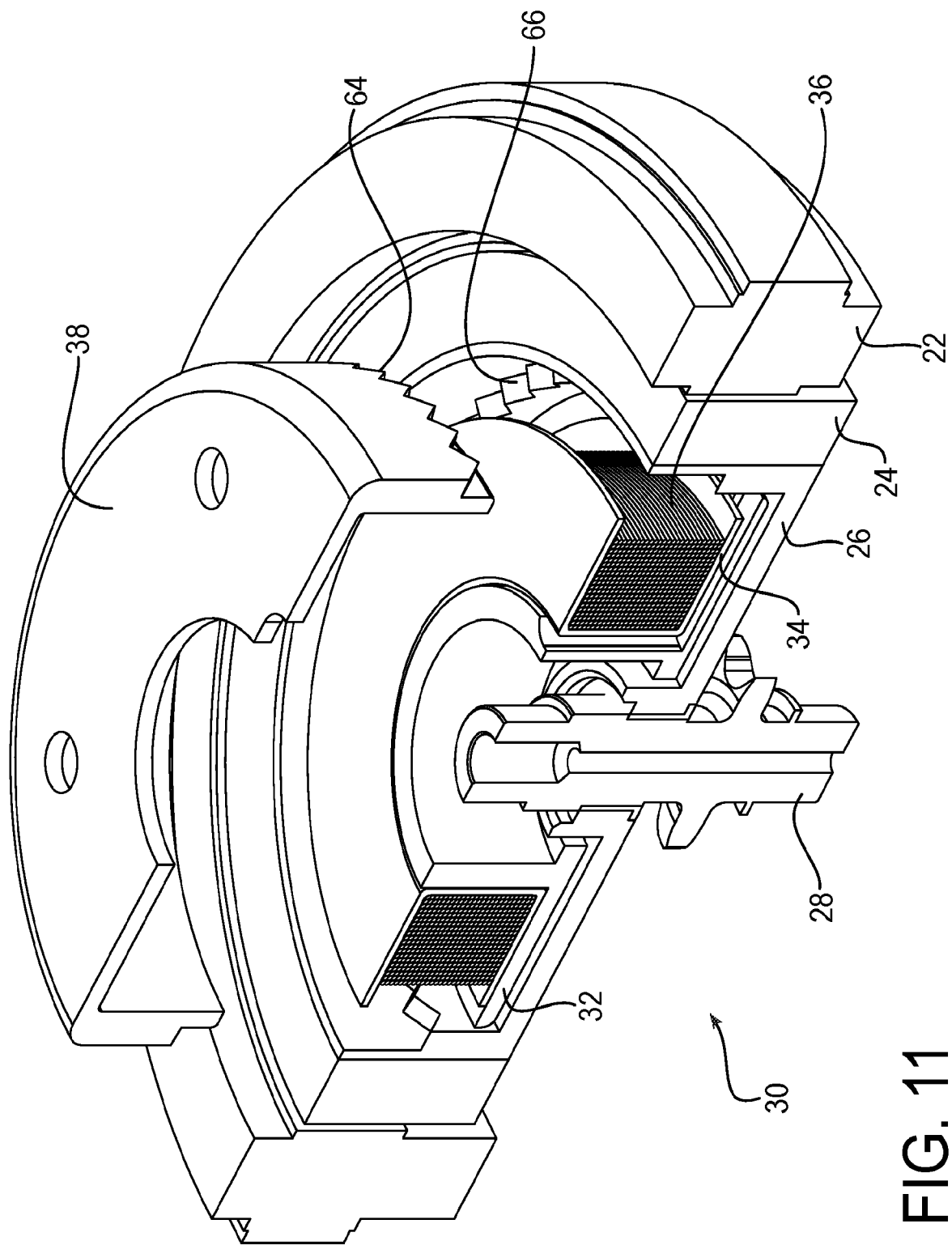
FIG. 11, FIG. 12, and FIG. 13 are drawings depicting various viewpoints of another variation of the braking interface employed by the brake assembly.
Figure 12:
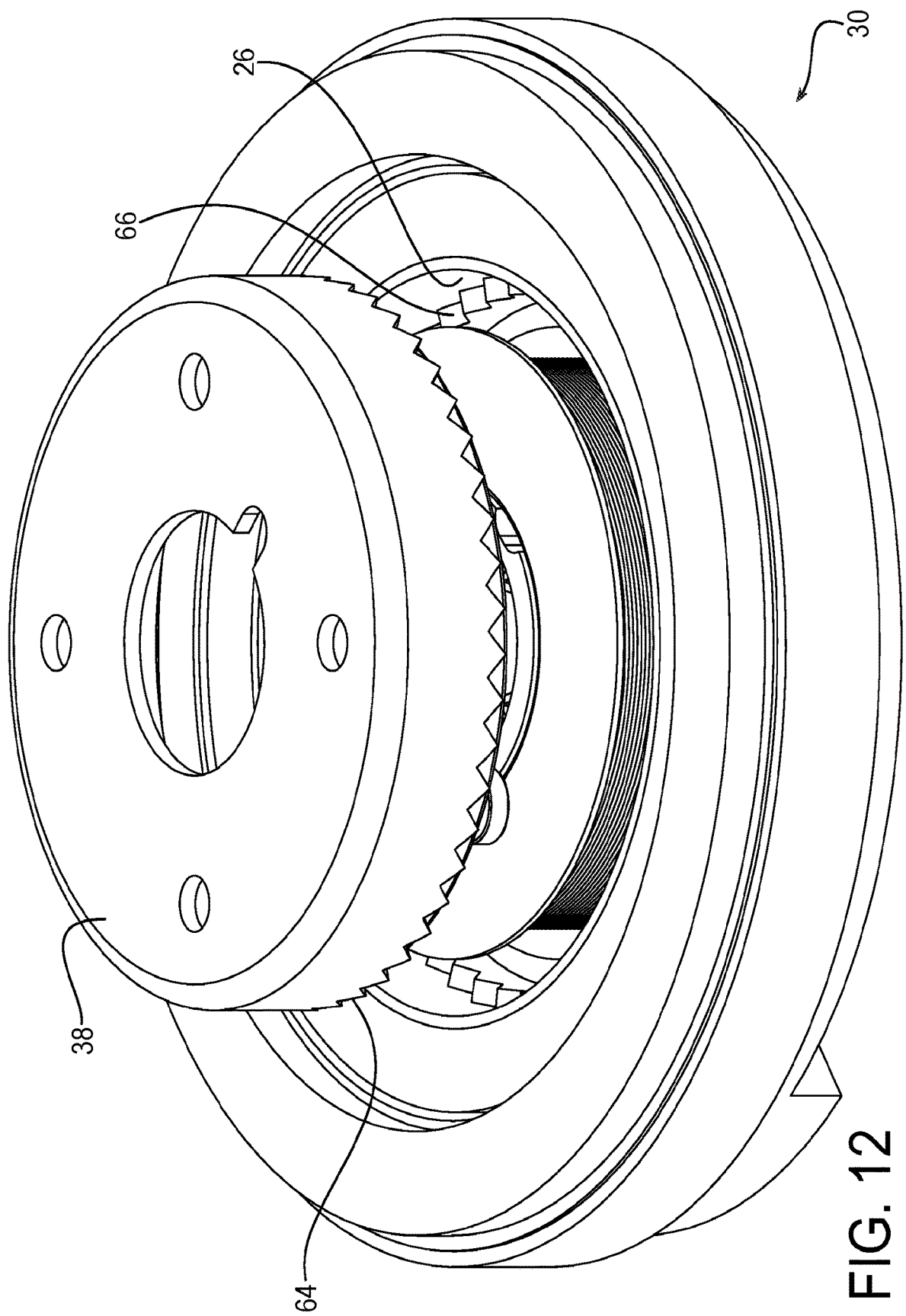
Figure 13:
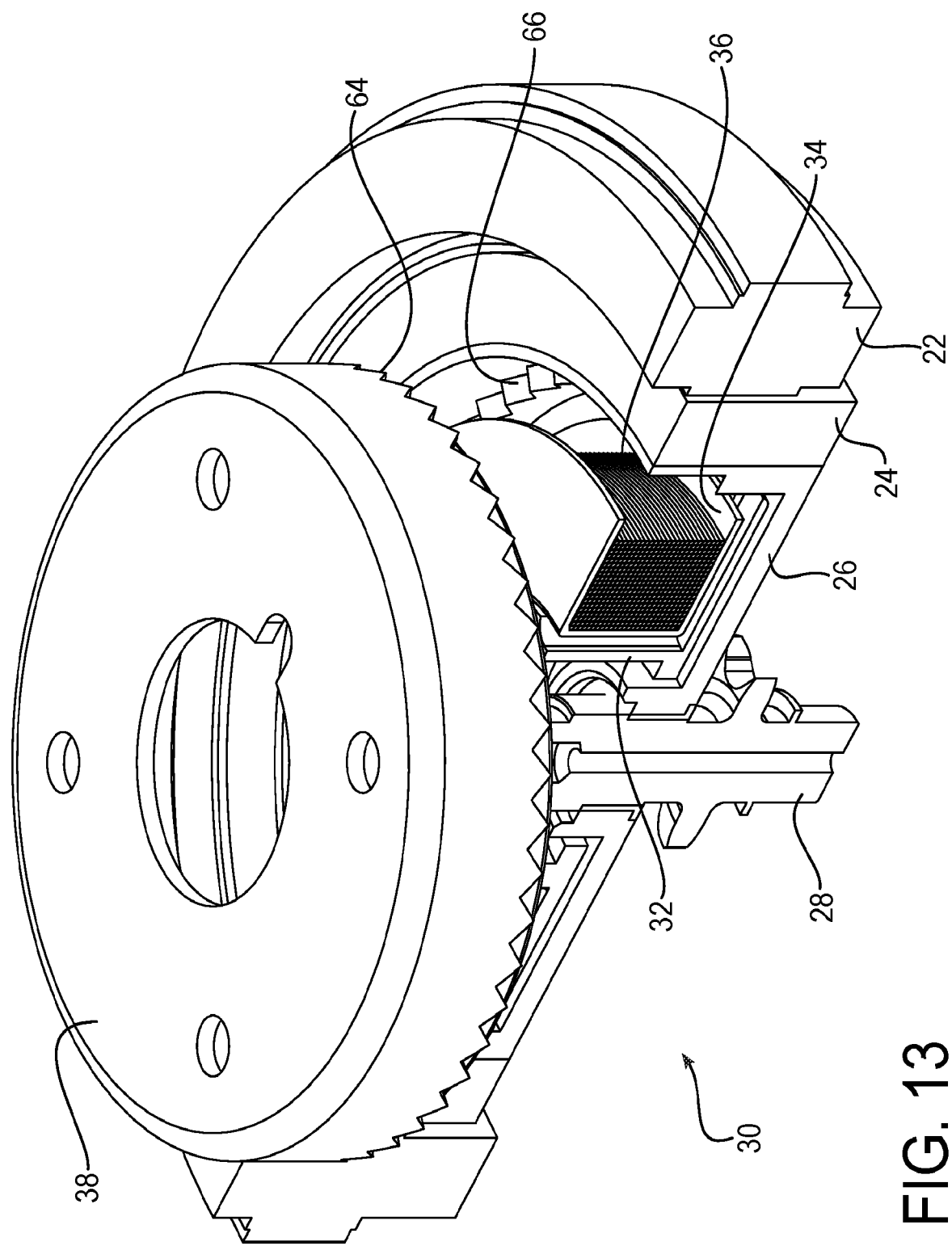

FIGS. 11-13 are drawings depicting various viewpoints of another variation of the braking interface employed by the brake assembly 30. As illustrated in FIGS. 11-13, as an alternative embodiment to frictional engagement, the mating surfaces of the armature 38 and motor spindle 26 may be configured for positive engagement through sets of interlocking features to provide mechanical interference. In this example, the armature 38 includes first interlocking teeth 64 that positively engage with opposing interlocking teeth 66 that are located on the motor spindle 26. Although the interlocking features in this example are depicted as opposing triangular teeth, other suitably shaped interlocking features may be employed. This mechanical interference could significantly increase the brake holding torque and/or significantly decrease the linear force required from the solenoid. The interfering mechanical features could be designed such that they are self-locking, or could be designed such that they could be made to slip at a certain level of torque, thus creating a torque-limiting brake/clutch mechanism.

As described in Applicant's Provisional Patent App. No. 62/712,322 referenced above, the actuator assembly further may include control electronics that are encompassed within the actuator housing. The control electronics may include a battery, sensors, and electronic circuit boards that control operation of the overall actuator system 10. In exemplary embodiments in which the actuator assembly is driven by a brushless DC motor, magnets in proximity to or coupled to the motor shaft may be provided with embedded sensors to sense the motor shaft rotation. The sensing components may operate as a Hall-effect sensor with connections to processor circuitry in the control electronics to measure the motor operation, which in turn may be used to determine the resultant positioning of the driven joint member 16. In this manner, accurate positioning of the joint member is achieved for precise controlling of the actuator system. Such sensing and control mechanism further may include control of the brake assembly 30 to provide joint holding torque for the knee of the stance leg during stepping. During a gait cycle corresponding to walking of numerous steps, the control mechanism may sequentially apply and release the brake assembly 30 corresponding to stance and swing states as sensed by the sensors.

Figure 14:
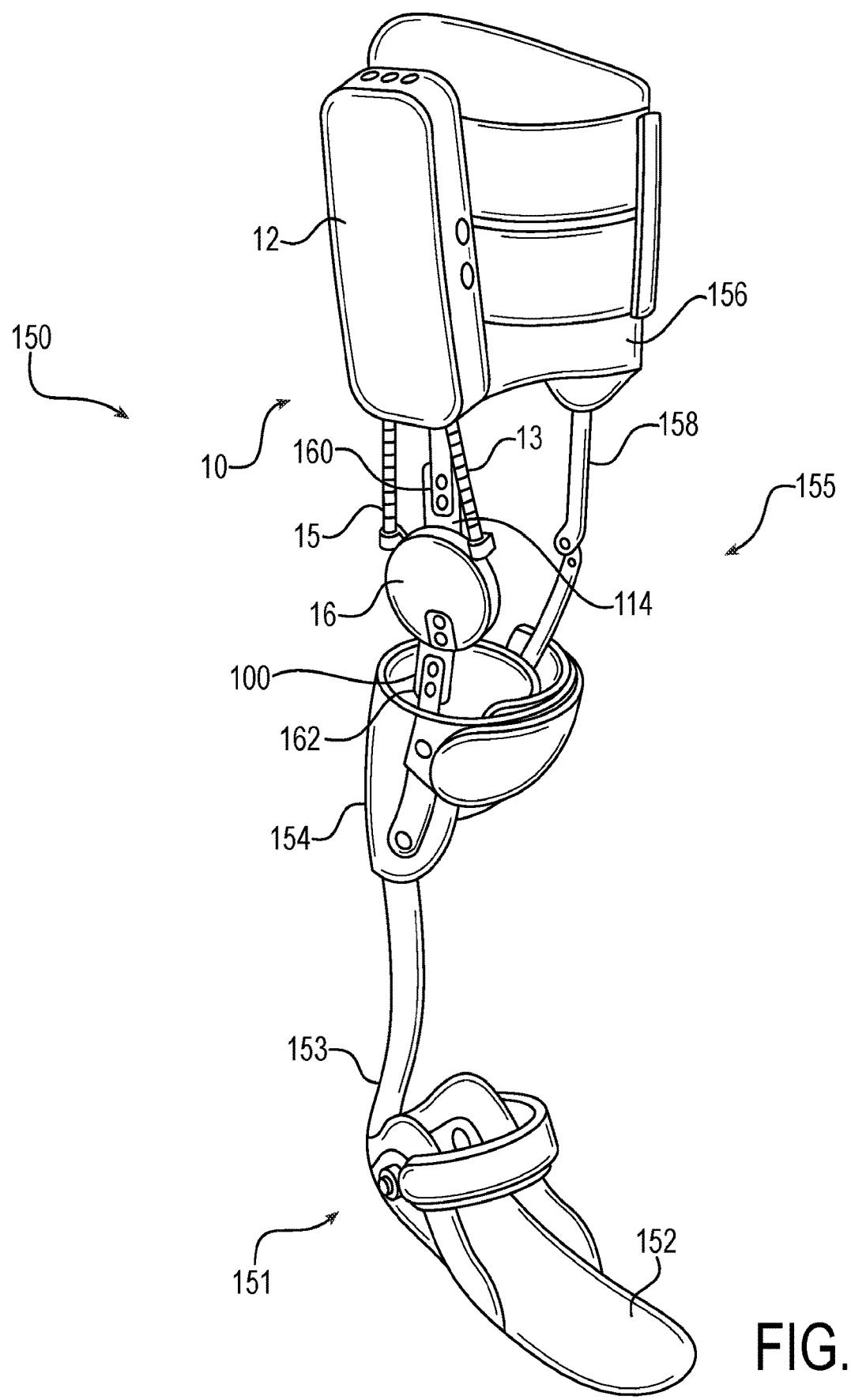
FIG. 14 is a drawing depicting an exemplary knee-ankle-foot orthotic (KAFO) device, which incorporates an actuator system in accordance with embodiments of the present invention.

FIG. 14 is a drawing depicting an exemplary knee-ankle-foot orthotic (KAFO) device 150, which incorporates the actuator system 10 in accordance with embodiments of the present invention. The actuator system 10 may be incorporated into essentially any conventional KAFO device. As is typical, the KAFO device 150 includes an ankle-foot orthosis 151 including a foot plate 152 and an ankle support 153 that can receive the foot of the user (typically including a shoe). The foot plate 152 may operate with a pressure sensor that can detect when the foot plate is on or off of the ground to aid in the gait control. The pressure sensor may be incorporated as part of the foot plate 152, or provided as a separate component that comes in contact with the foot plate 152, for pressure sensing. The pressure sensor may be wired or wirelessly connected to the control electronics of the actuator assembly. The KAFO device 150 further includes a leg brace 155 that includes a calf support 154 and a thigh support 156 that wrap around a user's leg. Such components may be secured to the user using straps that are retained with any suitable mechanical fasteners, such as Velcro®. The leg brace 155 connects the components to each other by arranging the components on a frame 158, typically made of metal such as for example steel, stainless steel, or aluminum. The referenced components form an orthotic brace to provide support for a user during walking.

Generally, a connector component of the driven joint member includes a first attachment bar that is connectable to a first brace component of the orthotic device, and a second attachment bar that is connectable to a second brace component of the orthotic device, whereby operation of the driven joint member rotates the first attachment bar relative to the second attachment bar to operate a joint of the orthotic device. In the example of a KAFO device, the actuator system 10 operates as a powered knee joint. The actuator system 10 is attached with the actuator assembly 12 mounted to the thigh support 156. The cable sheaths 13 and 15 extend downward to the driven joint member 16. The frame 158 includes a first joint bar 160 that extends downward from the thigh support 156, and a second joint bar 162 that extends upward from the calf support 154. The actuator system 10 further is connected to the brace components by connecting the first joint bar 160 of the frame to an attachment bar 114 of the driven joint member 16, and by connecting a second joint bar 162 of the frame to another attachment bar 100 of the driven joint member 16 such that the driven joint member 16 is positioned at the user's knee during use. The use of Bowden cables routed through cable sheaths permits a degree of flexibility in positioning that allows the full assembly to bend around the contours of the leg. In operation, the actuator assembly drives the driven joint member as described above to provide extension and flexion of the user's knee joint.

Figure 15:
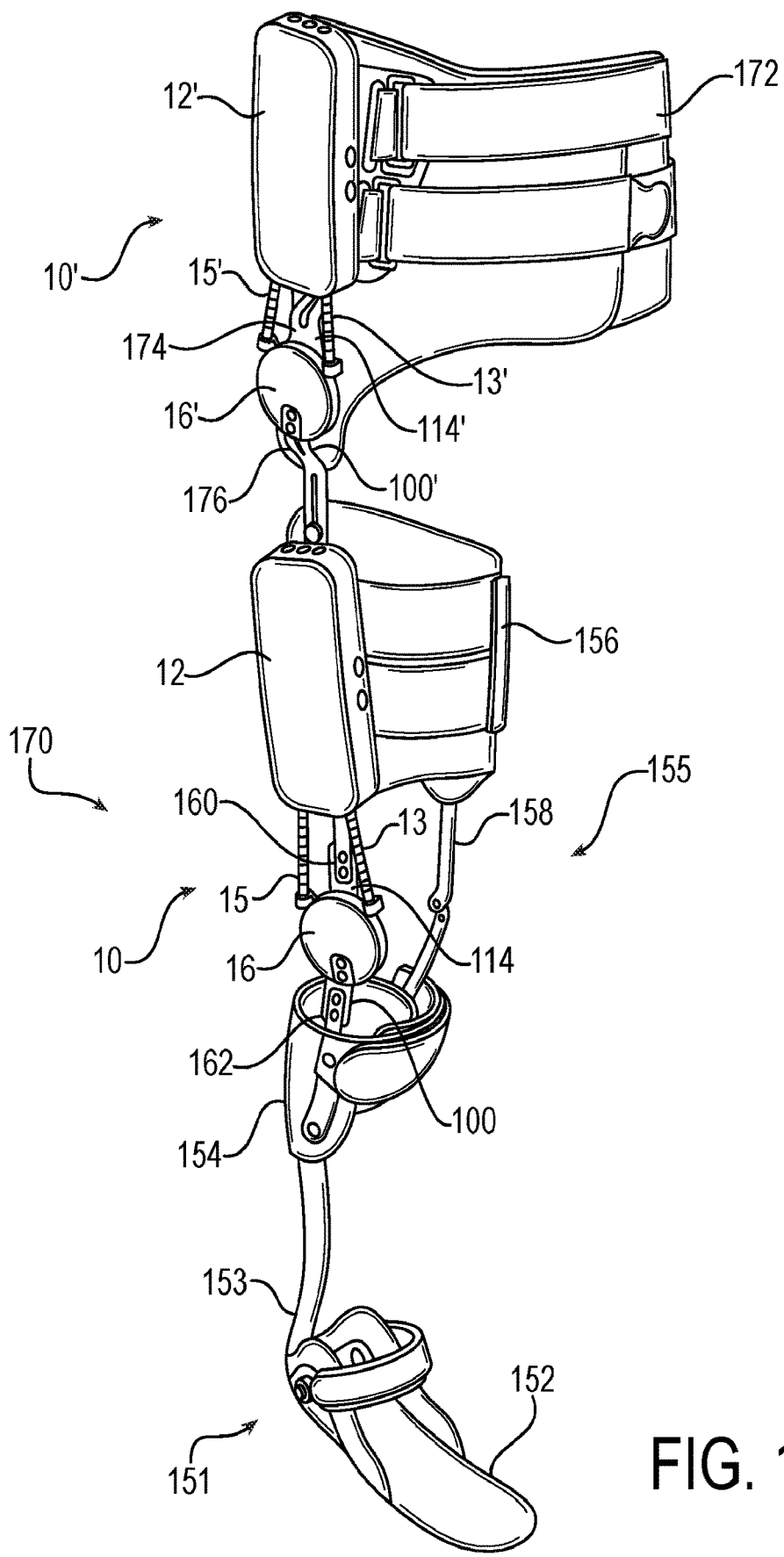
FIG. 15 is a drawing depicting an exemplary hip-knee-ankle-foot orthotic (HKAFO) device, which incorporates a first actuator system and a second actuator system in accordance with embodiments of the present invention.

FIG. 15 is a drawing depicting an exemplary hip-knee-ankle-foot orthotic (HKAFO) device 170, which incorporates a first actuator system 10 and a second actuator system 10' in accordance with embodiments of the present invention. Similarly as above, the actuator systems 10 and 10' may be incorporated into essentially any conventional HKAFO device. As is typical, the HKAFO device generally includes the components of the KAFO device described above. The HKAFO device 170 further includes a torso support 172 that wraps around a user's torso. The torso support 172 also may be secured to the user using straps that are retained with any suitable mechanical fasteners, such as Velcro®. The referenced components form an orthotic brace with added torso support to provide support for a user during walking. In addition, in the example of FIG. 15, the HKAFO device is a unilateral support device including brace components only for one leg (the right leg in this example). In other exemplary embodiments, a bilateral HKAFO device may be provided in which comparable brace components are provided for both legs.

In the example of an HKAFO device, the first actuator system 10 is positioned and operates as a powered knee joint in the manner described above for the KAFO device. In addition, the second actuator system 10' is positioned and operates as a powered hip joint. The second actuator system 10' is attached with the actuator assembly 12' mounted to the torso support 172. The cable sheaths 13' and 15' extend downward to the driven joint 16'. The frame 158 further includes a third joint bar 174 that extends downward from the torso support 172, and a fourth joint bar 176 that extends upward from the thigh support 156. The actuator system 10' further is connected to the brace components by connecting the third joint bar 174 of the frame to the second attachment bar 114' of the driven joint member 16', and by connecting the fourth joint bar 176 of the frame to the first attachment bar 100' of the driven joint member 16' such that the driven point member 16' is positioned at the user's hip during use. As referenced above, the use of Bowden cables routed through cable sheaths again permits a degree of flexibility in positioning that allows the full assembly to bend around the contours of the leg. In operation, the first and second actuator assemblies respectively drive both the driven joint members as described above to provide extension and flexion of the user's knee and hip joints. In addition, although the example HKAFO device 170 includes both powered knee and hip joints, one or the other of powered hip versus knee joints may be employed with the HKAFO brace configuration.

The use of the described actuation system has advantages over conventional configurations in that the actuator system can be readily integrated with standard orthotic bracing that is customized to a user body type. Such actuation system provides a smaller and lighter solution for powering wearable orthotic systems, which should also require less torque that is more suitable for orthotic devices. The actuator system configurations address the deficiencies of conventional configurations by minimizing the size of the driven joint, and by allowing the actuator assembly drive unit to be located remotely relative to the driven joint, transmitting power via flexible Bowden cables. With such configuration, varus and valgus angling at the human knee joint and/or hip abduction/adduction in the frontal plane is optimized for walking. The Bowden cable/sheaths configuration of the output of the third transmission stage permits locating the driven joint member remotely from drive motor and the first and second transmission stages. This permits the referenced degree of flexibility in positioning the driven joint member so that the actuator system may be integrated into a wide range of customizable orthotic devices, i.e., the actuator system is suitable for use with any standard type bracing as fitted to a given user without the need for additional customization of the actuator system itself.

The actuator system also may be back-drivable, meaning that a torque applied at the output driven joint member will cause the transmission, and ultimately the motor, to spin. This back-drivability is significant as it enables cooperative motion when worn by a user who is able to contribute some power for walking via their own muscles. By permitting user contribution to the walking power, the user experiences health benefits of muscle strengthening and ultimately an enhanced gait, characterized by a smoother gait motion and higher efficiency.

The described brake assembly results in a mobility assistance device that is more quiet, powerful, and low-profile as compared to conventional configurations, and which has optimal wear performance. The brake assembly may be incorporated into various types of powered mobility assistance devices, and in particular is suitable for use in mobility assistance devices for persons with impairments short of complete paralysis, such as KAFO and HKAFO devices. The brake assembly, therefore, provides effective holding torque to stabilize a human limb in a controllable manner during walking.

In addition, although the brake assembly of the present application has been described in connection with an actuator assembly that drives a joint member in a powered mobility assistance device, the brake assembly is not limited to such usage. Rather the brake assembly configurations of the present application may be suitable for any application in which the braking of a rotating member is desired.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An electromagnetic brake assembly comprising:
   a solenoid coil;
   a fixed ferrous brake stator;
   a ferrous armature having a braking face, wherein the armature is moveable in a translation direction relative to the brake stator between a disengaged position and an engaged position; and
   a rotating member including a mating surface and that rotates relative to the armature when the armature is in the disengaged position;
   wherein when the solenoid coil is energized, the armature translationally moves from the disengaged position to the engaged position, and in the engaged position the braking face of the armature interacts with the mating surface of the rotating member to apply a braking force to the rotating member;
   wherein the braking face of the armature is a conical face and the mating surface of the rotating member is a tapered surface opposing the conical face to form a conical braking interface; and
   further comprising a friction O-ring disposed within a groove at the conical braking interface between the conical face of the armature and the opposing tapered mating surface of the rotating member.

2. The electromagnetic brake assembly of claim 1, wherein the groove is configured as an elongated slot, and the friction O-ring rolls within the slot along the conical braking interface as the armature moves between the disengaged position and the engaged position.

3. The electromagnetic brake assembly of claim 1, further comprising a second friction O-ring disposed within a groove at the conical braking interface between the conical face of the armature and the opposing tapered mating surface of the rotating member.

4. The electromagnetic brake assembly of claim 1, further comprising anti-rotation features that restrict rotation of the armature.

5. The electromagnetic brake assembly of claim 4, wherein the anti-rotation features include one or more fixed mating pins that extend through the armature, and the armature moves translationally along the fixed mating pins between the engaged position and the disengaged position.

6. The electromagnetic brake assembly of claim 5, wherein the anti-rotation features are configured to permit a small degree of rotation of the armature of an amount of one to five degrees.

7. The electromagnetic brake assembly of claim 1, wherein the brake stator, armature, solenoid coil, and rotating member are positioned axially concentric relative to each other.

8. The electromagnetic brake assembly of claim 7, wherein the rotating member is a hollow member having an inner diameter and an outer diameter, and the brake stator, armature, and solenoid coil are located between the inner diameter and the outer diameter of the rotating member.

9. The electromagnetic brake assembly of claim 1, wherein the solenoid coil includes a wire coil wound around a non-ferrous bobbin.

10. The electromagnetic brake assembly of claim 1, wherein the rotating member is made of a non-ferrous rigid metal.

11. A powered mobility assistance device comprising:
an actuator assembly comprising a motor and a transmission assembly that provides a speed reduction of a motor speed to an output speed, the actuator assembly further comprising the electromagnetic brake assembly according to claim 1; and
a driven joint member comprising an output portion of the transmission assembly and a connector component for connecting the driven joint member to a brace component of the mobility assistance device;
wherein the rotating member of the brake assembly is fixed to a rotor of the motor, and the braking force applied to the rotating member operates to apply a holding torque to the driven joint member.

12. The powered mobility assistance device of claim 11, wherein the driven joint member is connected remotely from the actuator assembly by flexible cabling that runs between the actuator assembly and the driven joint member to permit flexibility in positioning the driven joint member relative to the actuator assembly.

13. The powered mobility assistance device of claim 11, further comprising a knee-ankle-foot orthosis (KAFO) brace, wherein the actuator assembly is attached to a thigh support of the KAFO brace, and the driven joint member acts a knee joint of the KAFO brace.

14. The powered mobility assistance device of claim 11, further comprising:
a hip-knee-ankle-foot orthosis (HKAFO) brace;
a first actuator assembly and a first joint member, wherein the first actuator assembly is attached to a thigh support of the HKAFO brace, and the first driven joint member acts as a knee joint of the HKAFO brace; and/or
a second actuator assembly and a second joint member, wherein the second actuator assembly is attached to a torso support of the HKAFO brace, and the second driven joint member acts as a hip joint of the HKAFO brace.

15. The electromagnetic brake assembly of claim 1, further comprising one or more magnets to provide a magnetic force to retract the armature when the solenoid coil is de-energized.

16. The electromagnetic brake assembly of claim 1, further comprising a spring to provide a spring force to retract the armature when the solenoid coil is de-energized.

* * * * *